Nov. 23, 1926.

C. A. SPOTZ

WEIGHING SCALE

Filed May 2, 1924     2 Sheets-Sheet 1

Inventor
C.A.Spotz

Nov. 23, 1926.
C. A. SPOTZ
1,608,190
WEIGHING SCALE
Filed May 2, 1924  2 Sheets-Sheet 2
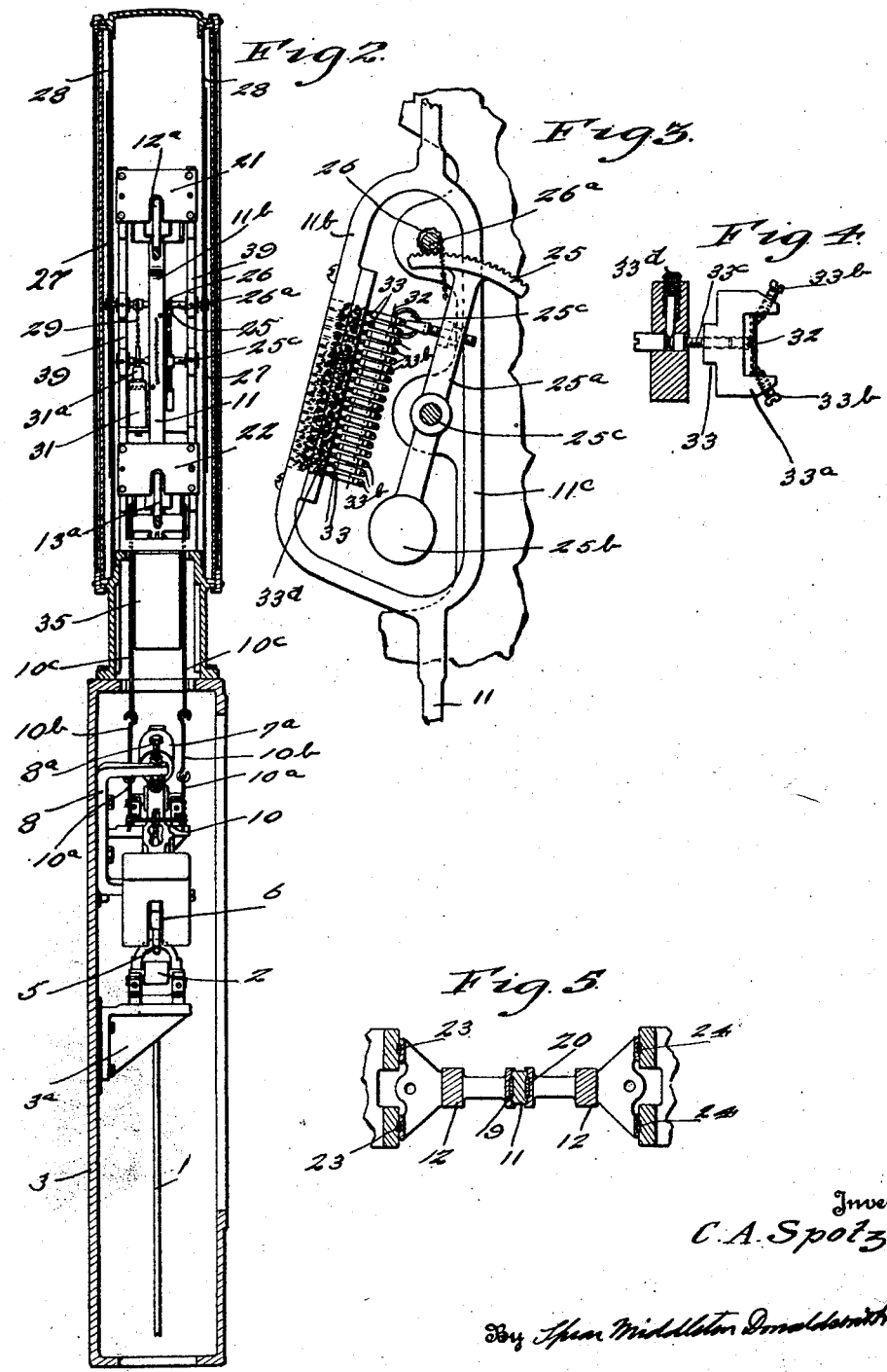

Patented Nov. 23, 1926.

1,608,190

UNITED STATES PATENT OFFICE.

CHESTER A. SPOTZ, OF GREENWICH, CONNECTICUT, ASSIGNOR TO THE C. A. SPOTZ MANUFACTURING COMPANY, INC., OF NEW YORK, N. Y., A CORPORATION OF CONNECTICUT.

WEIGHING SCALE.

Application filed May 2, 1924. Serial No. 710,620.

My present invention relates to weighing scales of the type known as "automatic head" and embodying weight determining means, such for example as a hand or pointer travelling over a graduated scale or dial, and comprises certain improvements upon the scale which forms the subject of an application filed by me in the United States Patent Office on the 8th day of July, 1920, Serial No. 394,661.

Among the objects of the said improvements, are to simplify the apparatus and make it more easy of commercial production, to eliminate friction in the parts as far as possible, and to impart steadiness during operation.

What I at present consider the preferred embodiment of the invention is illustrated in the accompanying drawings, in which:—

Fig. 2 is a central vertical transverse section.

Fig. 3 is an enlarged detail view showing the adjustable cam and cooperating parts.

Fig. 4 is a transverse sectional detail of the cam, and

Fig. 5 is a transverse sectional detail of the upper tape rollers and their associated parts.

Figure 1:
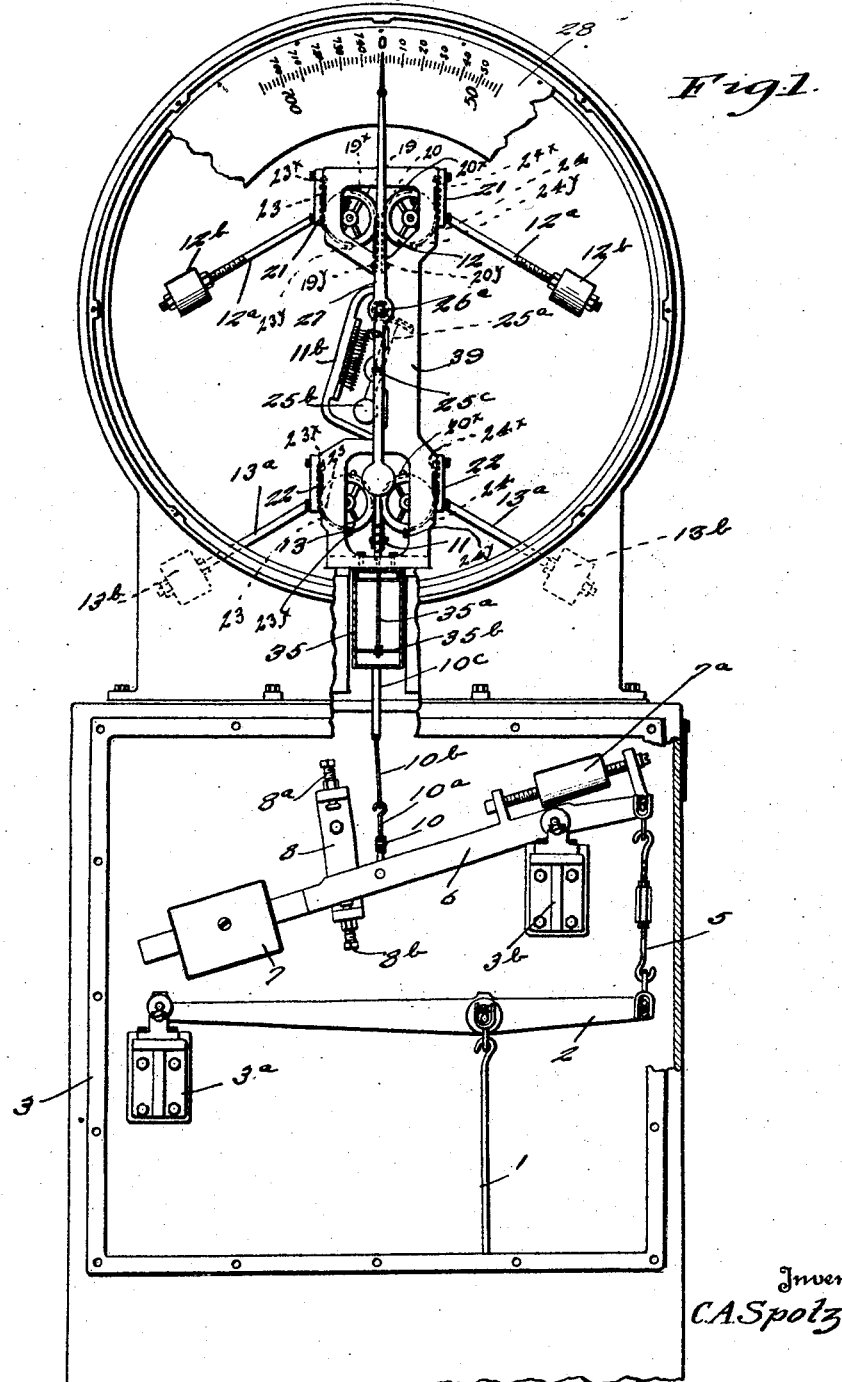
Figure 1 is a front elevation (partly broken away) of a scale head constructed in accordance with my invention, the weighing platform being omitted as unnecessary.

Referring by reference character to this drawing, the numeral 1 designates a connecting rod designed to have its lower end connected to the usual weighing platform lever mechanism (not shown), and its upper end pivotally secured to a scale lever 2 fulcrumed at one end on a bearing member or bracket $3^a$ carried by the frame 3 which may be supported by a standard or pedestal rising from the platform base (not shown).

The free end of lever 2 is connected by an adjustable link 5 with a lever 6 fulcrumed on bearing bracket $3^b$ and carrying a counterweight 7 at one end, movement thereof being limited by adjustable stops $8^a$ and $8^b$ carried by bracket 8. This lever may have connected therewith the usual beam members provided with the customary increased capacity, and tare weights at the front of the scale head, which are not shown, but will be readily understood by those skilled in the art, and may also carry an adjustable counterweight $7^a$. Lever 6 is also preferably provided with an auxiliary counterweight $7^b$ of micrometer adjustment.

The lever 6 is pivotally connected by means of a suitable cross bar 10 with a vertically reciprocable bar or plate 11 having accurately ground opposed surfaces to coact with the upper and lower sets of floating roller members 12 and 13 respectively. My preferred form of connection comprises a pair of rods or eye bolts $10^a$ having their lower threaded ends held in openings in the respective ends of the cross bar by means of nuts as shown, and having their upper ends connected by links $10^b$ to flexible steel bars or strips $10^c$ which in turn are connected by means such as screws to opposite edges of the bar 11.

Flexible steel bands or tapes 19 and 20 located centrally on opposite faces of the bar and partially countersunk therein, are connected at one end to the bar, as indicated at $19^y$ and $20^y$, their other ends being attached to the rollers at $19^x$ and $20^x$, said tapes being partially countersunk in said rollers, and the arrangement being such that the tapes can wind and unwind freely on the rollers while the portions of the rollers on each side of the tapes have direct and free rolling contact with the corresponding surfaces of the plate or bar 11 (see Fig. 5).

The said rollers on their opposite sides have rolling contact (each at two points) with the accurately ground faces of vertical plates 21 and 22 secured by means such as screw bolts to the parallel standards 39 carried by the scale frame. Tapes or bands 23 and 24 have their opposite ends connected respectively to the rollers at $23^y$ and $24^y$ and the bars at $23^x$ and $24^x$, said tapes being partially countersunk in the surfaces. The said roller members are provided with rigid arms $12^a$ and $13^a$ which carry counterweights $12^b$ and $13^b$, and it will be seen that as the bar 11 moves under the action or release of the load, the roller members will be rotated on their axes while having a falling and rising movement according to the direction of rotation, the tapes or bands having an unwinding action on the movement of the bar in one direction, and a reverse or winding action on the upward movement in the opposite direction, and the weights tending to rock the roller members in the direction to hold the plate or bar 11 at the limit of its upward movement. These roller members are in effect floating drums on which the reversely placed bands wind and unwind as described. Preferably the roller members or drums are of such diameter as to leave a very slight amount of clearance between their curved surfaces and the faces of the central bar 11 and plates 21 and 22 respectively, so as to give a substantially floating effect and eliminate friction, the co-operating faces of members 21 and 22 being accurately ground and exactly parallel with the faces of plate or bar 11.

While, as above stated, a small amount of clearance is provided to secure free movement, no appreciable twisting of bar 11 is possible, due to the four point support provided on each side by reason of the double contact of each roller portion with its corresponding guide bar, and the double contact of the roller parts with bar 11, or in other words, the contact on each side of the tape.

While I have shown two sets of upper and lower rollers, it will be understood that any number may be provided according to the size of the scale, and in small scales only one set might be used, anti-friction guides being substituted for the other set.

Secured to the plate 11 at a point between the upper and lower pairs of floating rollers and at one side thereof is an inclined cam member 32 which is designed to coact with and determine the movement of a gear segment carried by arm 25$^a$ mounted on shaft 25$^c$ and preferably counterweighted as indicated at 25$^b$, shaft 25$^c$ being journaled in bearings carried by or formed in standards 39. The gear segment meshes with a pinion 26 (see Fig. 3) on the shaft 26$^a$ which shaft also carries an indicating arm or pointer 27 which cooperates with the indicating scale or dial 28, which parts are intended to be representative of any suitable weight determining means. It will thus be seen that the oscillating movement of the gear segment causes the pointer to travel over the face of the dial.

Means are provided tending to move the pointer arm to the right (Fig. 1) or in a clockwise direction, and such means preferably takes the form of a flexible element 29 having one end portion secured to and wound upon the shaft 26$^a$ (or a drum thereon) journaled in standards 39, the pendant portion of the flexible element being provided with a weight, which, in the present embodiment comprises a hollow portion of the movable element 31$^a$ of a dash pot indicated at 31, said hollow portion being adapted to receive shot or the like. This weight is preferably made in the shape of a hollow casing containing shot, more or less of which may be used according to the desired speed of the pointer.

It may be noted at this point that the construction and arrangement of the parts just described is such that the thrust or direction of contact between rack 25 and pinion 26 is always in the same direction, irrespective of the direction of movement of gear segment, and this prevents any lost motion in the interengaging teeth, this being due to the fact that the weight 30 tends constantly to rotate the gear 26 in a clockwise direction (Fig. 4).

From the foregoing description, it will be apparent that normally the bar 11 will be held by the action of the counterweights 7 at the limit of its downward movement, and the rack bar will be held by the action of the cam face 32 on the roller 25$^e$ in such position as to cause the pointer to stand at the zero mark on the scale (Fig. 2), the roller 25$^e$ contacting with the low part of the cam. When a weight to be weighed is placed on the platform (not shown) rod 1 is pulled in a downward direction, swinging lever 2 on its fixed pivot and pulling down on lever 6 through link 5 thereby swinging lever 6 against the action of its counterweight and allowing connections 10, etc., and bar 11 to move upward under the action of counterweights 13$^b$. As the bar 11 moves upward the receding surface of the cam moves away from the roller 25$^e$, the latter being retarded by the action of the dash pot 31, whereupon the lever system is brought to balanced position and the roller thereafter advances into contact with the cam which stops its movement at the precise point to give the proper reading on the scale. When a weight has been weighed and the weight on the scale platform has been removed, and the bar 11 is moving downwardly, the cam will at first be carried sufficiently far by the inertia of the counterweights to swing the pointer back of the zero mark. As the cam again moves upward under the tendency of the counterweights to establish an equilibruim, the roller will be temporarily held out of contact with the face of the cam by the action of the dash pot 31 and the cam will be freed from the slight frictional contact of the roller. This freeing of the roller from the cam surface therefore, takes place both on the weighing operation and on the return to normal position, and thus the counterweights are enabled to more quickly and accurately assume their proper position.

The cam is constructed and arranged so as to be readily adjustable to correct any inaccuracies, and by making the cam adjustable I am enabled to eliminate the necessity of providing any means of adjustment in the other parts of the scale, which have heretofore been found to be necessary in scales as customarily found on the market.

My preferred manner of accomplishing this is to form the cam surface in the shape of an elongated member having a certain degree of flexibility, and in order that the bar 11 may be located in substantial alignment with shafts 25$^c$ and 26, I provide the plate with an offset cam-carrying part 11$^b$ and also preferably with an opposite bracing part 11$^c$ which parts form an open frame or loop connecting the upper and lower portions of the bar and which loop may be made integral with the bar. The open space of the loop is elongated sufficiently to permit sufficient rectilinear movement of the bar without interfering with the shafts aforesaid. Cam-carrying part 11$^b$ is inclined to the perpendicular, converging upwardly towards the plane of the bar, and the cam surface is made in the shape of a metal strip 32 preferably having a plurality of transverse grooves in the back face thereof, as indicated, such grooves forming weakened portions which may be located at any desired distances apart and vary in number according to the length of the element and the uses for which it is intended, such distances corresponding to unit indications on the dial. My preferred manner of supporting the strip or element 32 is to connect it by a plurality of adjustable struts 33 with the bar part or member 11$^b$, and such attaching and adjusting struts preferably take the form of forked members 33$^a$ (Fig. 4) adapted to embrace the sides of the flexible surface element 32 and having knife edges designed to rest in the grooves in the back face thereof, the element 32 being held in such position by suitable devices, such for example as diagonal screws 33$^b$ threaded through the arms of the forked members and impinging against the edges of the element 32. Such forked members are adjustably connected with the carrying member 11$^b$ by suitable means, such as rods 33$^c$ having enlarged portions rotatably mounted in openings in the carrying member and held therein by transverse screws 33$^d$ engaging annular grooves in the rods, said rods having threaded ends engaging correspondingly threaded openings in the forked members. By turning the screw rods in the proper direction by means such as a screw driver applied to the kerfs in the outer ends of the screw rods they may be screwed in or out to give the desired adjustment to the corresponding portions of the element 32 and may be locked in such position by tightening the locking screws 33$^b$. Each strut corresponds to a definite weight amount, as indicated by the weight numerals in Fig. 1. Preferably the cam surface element 32 is supported wholly by the adjustable struts, although, if desired, one end could be rigidly supported. While I have shown the cam plate as of straight form, it will be understood that this is to be representative of any form of cam plate which in its movement is adapted to properly and accurately position the various parts.

By making the cam plate with a plurality of portions independently adjustable, it will be readily seen that any particular portion or portions may be adjusted to correct the reading on the scale and make it strictly accurate without requiring adjustments to be made on any other part of the scale, and without disturbing the equilibrium of the scale.

The vertically movable plate or bar 11 has connected to its lower end the stem 35$^a$ of the movable element or piston 35$^b$ of a dash pot 35, which dash pot serves to retard the downward movement of the bar. The dash pot 31 is constructed so that its action is a little slower than that of the dash pot 35, which allows the counterbalance weights to establish an equilibrium during the action of the dash pot 31 in the manner and for the purpose hereinbefore described. By the use of the spaced connecting members 10$^c$, etc., I am enabled to position the dash pot directly under and in vertical alignment with the vertically movable bar 11, so that all danger of binding sliding contact, or friction of the movable element or piston of the dash pot is avoided and its free movement assured.

Both of these dash pots have their piston elements ported and provided with valves which open on movement in one direction, and close on movement in the other direction so that on movement in one direction free passage of liquid is permitted, while on movement in the other direction the liquid can only escape around the edge of the piston which thereby materially retards the action.

While I have, in the above specification, shown and described weights as the counterbalancing means, it will be understood that my invention is not limited to the use of weight or any specific form of counterbalancing means, weights and springs being well known equivalents of each other.

By arranging the connections so that the bar moves upward, I relieve all of the parts above the lever 6 from the detrimental effects of weights or loads which may be roughly placed or dropped on the scale platform.

Having thus described my invention, what I claim is:—

1. In a weighing scale; a cam adapted to be moved by the weight to be weighed, a weight determining member, an oscillating element pivotally mounted in the scale head and operatively connected with said weight determining member, said oscillating element being provided with a cam contact part which contacts with a high part of the cam when the weight determining member is at zero position, and being also provided with a gear segment, a gear meshing with said segment, and means tending constantly to rotate said gear to urge the cam contact part towards the cam.

2. In a weighing scale a bar adapted to be moved in a rectilinear path, by the weight to be weighed, a substantially inclined cam carried by said bar, an oscillating element pivotally mounted in the scale head, a weight determining member operatively connected with said oscillating member, said last named member having a cam contact part arranged to contact with the high part of the cam when the weight determining member is at zero, and yieldable means tending to rotate said oscillating member to urge the contact part towards the cam.

3. In a weighing scale a cam adapted to be moved by the weight to be weighed, a contact member cooperating with said cam, a movable gear member with which said contact part is rigidly connected, a toothed pinion meshing with said gear member, yielding means for rotating said toothed pinion, a pointer connected to be moved in unison with said toothed pinion, a dash pot for modifying the movement of the gear member, and a dash pot for modifying the action of said yielding means, said last named dash pot being arranged to have a slower movement than said first named dash pot.

4. In a weighing scale a bar adapted to be moved in a rectilinear path by the weight to be weighed, an inclined bracket member carried thereby, a flexible cam, a plurality of forked members in the forks of which said flexible cam is seated, rotatable elements carried by said bracket and having threaded connection with said forked members, a movable member movable towards and from said cam and having a cam contact part, and weight determining means connected to move in unison with said movable member.

5. In a weighing scale a bar adapted to be moved in a rectilinear path by the weight to be weighed, an inclined bracket member carried thereby, a flexible cam, a plurality of forks adjustably carried by said bracket and receiving said cam, means carried by the arms of the forks and overhanging the edges of the cam for retaining it in place, a movable member associated with said cam, means for moving it towards and from the cam, a roller carried by said movable member and contacting with the face of the cam between said overhanging means, and weight determining means connected to operate in unison with said movable member.

6. In a weighing scale a vertical bar adapted to be moved by the weight to be weighed, upper and lower parallel guides on each side of said bar, upper and lower pairs of floating drums arranged between said bar and said guides, a pair of tapes on each of said drums connected respectively to said bar and the corresponding guide, an inclined cam carried by said bar, a movable element yieldingly pressed towards said cam and carrying a cam contact part, and weight determining means connected to operate in unison with said movable member.

7. In a weighing scale a vertical bar adapted to be moved by the weight to be weighed, upper and lower parallel guides on each side of said bar, upper and lower pairs of floating drums arranged between said bar and said guides, a pair of tapes on each of said drums connected respectively to said bar and the corresponding guide, said rollers being arranged to contact with the bar and guides at two spaced points on each whereby the rollers have a four point contact with the bar and guides, an inclined cam carried by said bar, a movable element yieldingly pressed towards said cam and carrying a cam contact part, and weight determining means connected to operate in unison with said movable member.

8. In a weighing scale, a rectilinearly movable bar adapted to be moved by the weight to be weighed, and having an offset portion, an inclined cam carried by said bar, a gear journaled on a stationary axis lying in the plane of the bar in the space formed by said offset portion, an oscillating member having an arc-shaped rack meshing with said gear and carrying a cam contact part, means tending to yieldably move said oscillating member to urge the contact part towards the cam, and weight determining means actuated by said oscillating member.

9. In a weighing scale a vertical bar adapted to have rectilinear motion imparted thereto by the weight to be weighed, upper and lower parallel guides on each side of said bar, upper and lower pairs of floating drums arranged between said drums and said guides, a pair of tapes on each of said drums connected respectively to said bar and the corresponding guide, said bar comprising upper and lower parts coacting with said drums as aforesaid and an intermediate loop connecting said parts, an inclined cam carried by one side member of said loop, a toothed pinion carried by a shaft journaled in fixed bearings and lying within said loop, a second shaft journaled in fixed bearings and lying within said loop, a pointer carried by said second shaft, a gear segment fast on said second shaft and meshing with said toothed pinion, a cam contact part operatively connected with said gear segment, and yielding means tending constantly to rotate said pinion in a direction to move the gear segment towards the cam.

10. In a weighing scale a rectilinearly movable bar adapted to be moved by the weight to be weighed, upper and lower pairs of floating cylindrical drums by which said bar is guided, counterbalance means tending normally to move said bar downwardly, means whereby the bar is moved in an upward direction under the influence of the weight to be weighed, and indicating means arranged to be positioned by the movement of said bar.

In testimony whereof, I affix my signature.

CHESTER A. SPOTZ.